United States Patent
Gerla et al.

(10) Patent No.: US 7,299,280 B2
(45) Date of Patent: Nov. 20, 2007

(54) METHOD AND APPARATUS FOR TCP WITH FASTER RECOVERY

(75) Inventors: Mario Gerla, Santa Monica, CA (US); M. Yahya Sanadidi, Santa Monica, CA (US); Claudio E. Casetti, Turin (IT); Saverio Mascolo, Irsina (IT); Scott Lee, Whittier, CA (US)

(73) Assignee: The Regents of University of California, Los Angeles, CA (US)

( * ) Notice: Subject to any disclaimer, the term of this patent is extended or adjusted under 35 U.S.C. 154(b) by 779 days.

(21) Appl. No.: 10/272,646

(22) Filed: Oct. 16, 2002

(65) Prior Publication Data

US 2003/0149785 A1 Aug. 7, 2003

Related U.S. Application Data

(60) Provisional application No. 60/330,364, filed on Oct. 17, 2001.

(51) Int. Cl.
 G06F 15/173 (2006.01)
 G06F 15/16 (2006.01)
(52) U.S. Cl. .................. 709/224; 709/230; 709/235
(58) Field of Classification Search .............. 709/224, 709/230, 235
See application file for complete search history.

(56) References Cited

U.S. PATENT DOCUMENTS

| 5,132,964 | A * | 7/1992 | Esaki .......................... 370/418 |
| 5,872,920 | A * | 2/1999 | Hausman et al. ............ 709/250 |
| 6,262,990 | B1 * | 7/2001 | Ejiri ............................ 370/412 |
| 6,421,348 | B1 * | 7/2002 | Gaudet et al. ............... 370/401 |
| 6,480,498 | B1 * | 11/2002 | Gaudet et al. ............... 370/402 |
| 6,643,259 | B1 * | 11/2003 | Borella et al. ............... 370/231 |
| 6,757,255 | B1 * | 6/2004 | Aoki et al. ................... 370/252 |
| 6,765,878 | B1 * | 7/2004 | Carlson ........................ 370/252 |

(Continued)

OTHER PUBLICATIONS

Moldeklev et al., "How a Large ATM MTU Causes Deadlocks in TCP Data Transfers", IEEE Transactions on Networking, vol. 3, No. 4, Aug. 1995.*
Mascolo, Saverio, et al., "An ABR Congestion Control Algorithm Feeding Back Available Bandwidth and Queue Level," ATM Workshop Proceedings, Fairfax, VA., 1998 IEEE, May 26, 1998, pp. 91-96.

(Continued)

*Primary Examiner*—Ario Etienne
*Assistant Examiner*—Hussein A El-chanti
(74) *Attorney, Agent, or Firm*—Christie, Parker & Hale, LLP.

(57) ABSTRACT

A method and apparatus for congestion control of a Transmission Control Protocol (TCP) connection. A TCP source monitors received acknowledgments (ACKs) and uses header information associated with the ACKs to determine an amount of data delivered at a TCP receiver. The amount of delivered data, divided by the time requited to deliver the data, gives a measure of instant data rate. The instant data rate is input to a filtering and averaging process to generate an estimate of the end-to-end bandwidth share or data rate of the connection. For the entire duration of the connection, the TCP source updates its estimate of the end-to-end bandwidth share every time an ACK is received. The estimate of the end-to-end bandwidth share is used the reset a congestion window and a slow start threshold whenever packet loss is indicated such as whenever a timeout expires or whenever three (3) duplicate ACKs are received.

19 Claims, 3 Drawing Sheets

U.S. PATENT DOCUMENTS

| | | | | |
|---|---|---|---|---|
| 6,772,375 | B1* | 8/2004 | Banga | 714/47 |
| 6,779,043 | B1* | 8/2004 | Crinion | 709/249 |
| 6,952,424 | B1* | 10/2005 | Bass et al. | 370/412 |
| 6,954,430 | B2* | 10/2005 | Haglund | 370/232 |
| 6,990,070 | B1* | 1/2006 | Aweya et al. | 370/230 |
| 7,092,355 | B1* | 8/2006 | Duong-Van | 370/230 |
| 7,099,273 | B2* | 8/2006 | Ha et al. | 370/229 |
| 7,130,268 | B2* | 10/2006 | Mascolo | 370/232 |

OTHER PUBLICATIONS

Almesberger, Werner, et al., "SRP: A Scalable Resource Reservation Protocol for the Internet," Quality of Service 1998, Sixth International Workshop on Napa, CA, May 18-20, 1998, pp. 107-116.

Mascolo, S., et al., "TCP Westwood: Congestion Control With Faster Recovery," UCLA CSD Technical Report, Jul. 2000, pp. 1-14.

* cited by examiner $$b_k = \frac{d_k}{t_k - t_{k-1}}$$

FIG. 2

$$\hat{b}_k = \frac{\frac{2\tau}{t_k - t_{k-1}} - 1}{\frac{2\tau}{t_k - t_{k-1}} + 1} \hat{b}_{k-1} + \frac{b_k + b_{k-1}}{\frac{2\tau}{t_k - t_{k-1}} + 1}$$

FIG. 3

$$\hat{b}_k = a\hat{b}_{k-1} + \frac{(1-a)}{2}[b_k + b_{k-1}]$$

FIG. 4

METHOD AND APPARATUS FOR TCP WITH FASTER RECOVERY

CROSS-REFERENCE TO RELATED APPLICATION

The present application claims priority to U.S. Provisional Patent Application No. 60/330,364, filed Oct. 17, 2001 which is hereby incorporated by reference as if set forth in full herein.

STATEMENT REGARDING FEDERALLY SPONSORED RESEARCH OR DEVELOPMENT

The U.S. Government has certain rights in this invention pursuant to grants ANI-9983138 and ANI-9805436 awarded by the National Science Foundation and grant NAG2-1249 awarded by the National Aeronautics and Space Administration.

BACKGROUND OF THE INVENTION

Transmission Control Protocol (TCP) is a transport protocol widely used in the Internet. It is a protocol between two hosts, such as a TCP source and a TCP receiver, providing (1) error recovery, and (2) congestion control. The error recovery is provided by an acknowledgment scheme. Acknowledgments (ACKs) are sent by the TCP receiver to the TCP source, and confirm the arrival of a packet at the TCP receiver. Congestion control is provided via a window scheme. In essence, the TCP source is allowed to send a number of packets equal to the "congestion window" size (called "cwin" in the TCP standard). The TCP source then stops and waits for ACKs before resuming transmission. When the value of cwin is high, the TCP source manages to transmit several packets before feedback from the TCP receiver. When cwin is low, the opposite is true. Thus, cwin can be used for congestion control. The TCP source keeps increasing the TCP source's cwin value and thus, the TCP source's sending rate, as long as the TCP source perceives that the network is not congested. The TCP source reduces cwin, on the other hand, when the TCP source senses that network congestion is building up.

Congestion is detected from packet loss. In the current standard TCP, two indications of packet loss are taken into consideration: (1) The reception of 3 duplicate ACKs, and (2) The expiration of a time interval (Timeout) after a packet transmission, without receiving any feedback from the TCP receiver. The first indication is considered "soft loss" since the path from TCP source to TCP receiver appears to be still in operation, even after packet loss. The second indication is considered more serious since the TCP source has no indication that anything has been delivered to the TCP receiver after packet loss. The current design for TCP congestion control assumes that every packet loss is because of congestion in the network. This assumption is justified in a network with optical fiber links where losses on the link because of link errors are extremely rare. However, when some of the links are not optical, and particularly when some links are wireless, error rates are significant, and packets can be lost because of congestion or because of error on transmission links.

After three (3) duplicate ACKs are received at the TCP source, in one TCP protocol (named New Reno) cwin is reset to half its current value. If the Timeout expires, cwin is reset to 1. That is the TCP source can only send one packet and then has to wait for a feedback from the TCP receiver.

In addition to cwin, another congestion control parameter in TCP is the so-called Slow Start Threshold, or ssthresh. This parameter is also used in setting the sending rate of the TCP source. In particular, ssthresh controls the rate of increase of the sending rate when feedback from the TCP receiver is positive. Ssthresh does have significant impact on network congestion control. If the threshold indicates that the rate of increase of cwin should be high, a TCP source can increase its sending rate at a high rate possibly inducing congestion. Thus setting ssthresh properly is desired for proper congestion avoidance.

SUMMARY OF THE INVENTION

In one aspect of the invention, a method for estimating the bandwidth share of a TCP connection is provided. A TCP source monitors received ACKs. The TCP source uses header information associated with the ACKs to determine an amount of data delivered at the TCP source. The amount of delivered data is then input to a filtering and averaging process. The output of the filtering/averaging process is an estimated bandwidth share or the data rate of the connection. For the entire duration of the connection, the TCP source updates its estimate of the bandwidth share every time an ACK is received. The estimate is used whenever packet loss is indicated; that is, whenever a timeout expires or whenever three (3) duplicate ACKs are received.

In another aspect of the invention, a method is provided for use of an estimated bandwidth share of a connection between a TCP source and a TCP receiver to provide a congestion control mechanism. Whenever the TCP source perceives a potential packet loss, the estimated bandwidth share is used to determine congestion control parameters as follows: (1) a congestion window size is generated using the estimated bandwidth share of the connection and an estimated round trip propagation time from the TCP source to the TCP receiver, and (2) a slow start threshold is generated using the estimated bandwidth share of the connection and the estimated round trip propagation time from the TCP source to the TCP receiver.

In one embodiment of the invention, a method of setting a parameter for a transport protocol used by a source to transmit data to a receiver across a connection through a computer network is provided. The method includes generating an estimate of end-to-end bandwidth share available to the connection through the computer network and setting the parameter using the estimated end-to-end bandwidth share for the connection if congestion is detected on the computer network.

In another embodiment of the invention, the estimated end-to-end bandwidth share is generated by generating a sample bandwidth share and filtering the sample bandwidth share to generate the estimated end-to-end bandwidth share.

In another embodiment of the invention, generating the sample bandwidth share further includes determining a quantity of data transmitted by the source to the receiver over the connection and an elapsed time for transmission of the quantity of data. The quantity of data transmitted and the elapsed time are then used to generate the sample bandwidth share.

In another embodiment of the invention, determining the elapsed time is accomplished by receiving by the source from the receiver a first acknowledgment at a first time and a second acknowledgment at a second time and determining the elapsed time using the difference between the first time and the second time.

In another embodiment of the invention, determining the quantity of data is accomplished by receiving duplicate acknowledgments by the source and determining the quantity of data using an average of segment sizes of data packets transmitted by the source to the receiver.

In another embodiment of the invention, the sample bandwidth share is filtered using an exponential filter.

In another embodiment of the invention, the sample bandwidth share is filtered using a discrete time filter.

In another embodiment of the invention, the modified parameters are a slow start threshold and optionally a congestion window used in a transmission control protocol.

In another embodiment of the invention, an apparatus for setting a parameter for a transmission control protocol used by a source to transmit data to a receiver across a connection through a computer network is provided. The apparatus has a processor and a memory coupled to the processor. Store in the memory are processor executable program instructions. While executing the program instructions, the processor receives a first acknowledgment at a first time and a second acknowledgment at a second time. The processor then determines an elapsed time using the difference between the first time and the second time and determines a quantity of data transmitted by the source to the receiver using the first acknowledgment and the second acknowledgment. The processor then generates a sample bandwidth share using the quantity of data transmitted and the elapsed time. The process then generates an estimated end-to-end bandwidth share available to the connection by filtering the sample bandwidth share. When the processor detects that the computer network is becoming congested, the processor generates a congestion window and a slow start threshold using the estimated end-to-end bandwidth share.

BRIEF DESCRIPTION OF THE DRAWINGS

These and other features, aspects, and advantages of the present invention will become better understood with regard to the following description, accompanying drawings, and attached appendices where:

FIG. 2 is a formula for calculating a sample bandwidth by an embodiment of a TCP control process in accordance with the present invention;

FIG. 3 is a formula for a discrete time filter as used by an embodiment of a TCP control process in accordance with the present invention;

FIG. 4 is a formula for a discrete time filter with constant coefficients as used by an embodiment of a TCP control process in accordance with the present invention.

DETAILED DESCRIPTION OF THE INVENTION

Resetting cwin to half its value by a TCP source when three (3) duplicate ACKs are received has been proven to be useful when no other information is available about network conditions. However, a TCP version in accordance with an exemplary embodiment of the present invention, herein termed "TCP Westwood", utilizes available information about the network and about a path from the TCP source to a TCP receiver. In particular, the TCP source may monitor the flow of ACKs, thus estimating the rate at which data is delivered to the TCP receiver. By exploiting such information, the TCP source can more intelligently set the cwin value, and the ssthresh value when packet loss is sensed. This intelligence has a stronger positive impact on the efficiency of the system when the dominant cause of packet loss is link errors as opposed to congestion.

The resulting congestion control scheme better utilizes available network capacity since it sets the congestion control parameters more intelligently as indicated above. The result is that more connections may be supported on the same path in the network, and transfer of data may be completed significantly faster under certain conditions.

A design philosophy of the standard Internet TCP congestion control algorithm is that it is performed end-to-end. A network is considered as a "black box" meaning a TCP source cannot receive any explicit congestion feedback from the network. Therefore the TCP source, to determine the rate at which it can transmit, probes the path by progressively increasing the input load (through the slow start and congestion avoidance phases) until implicit feedback, such as timeouts or duplicate acknowledgments, signals that the network capacity has been reached. The end-to-end principle guarantees the delivery of data over any kind of heterogeneous network. An aspect of TCP Westwood is to exploit TCP acknowledgment packets to derive network measurements.

Figure 1:
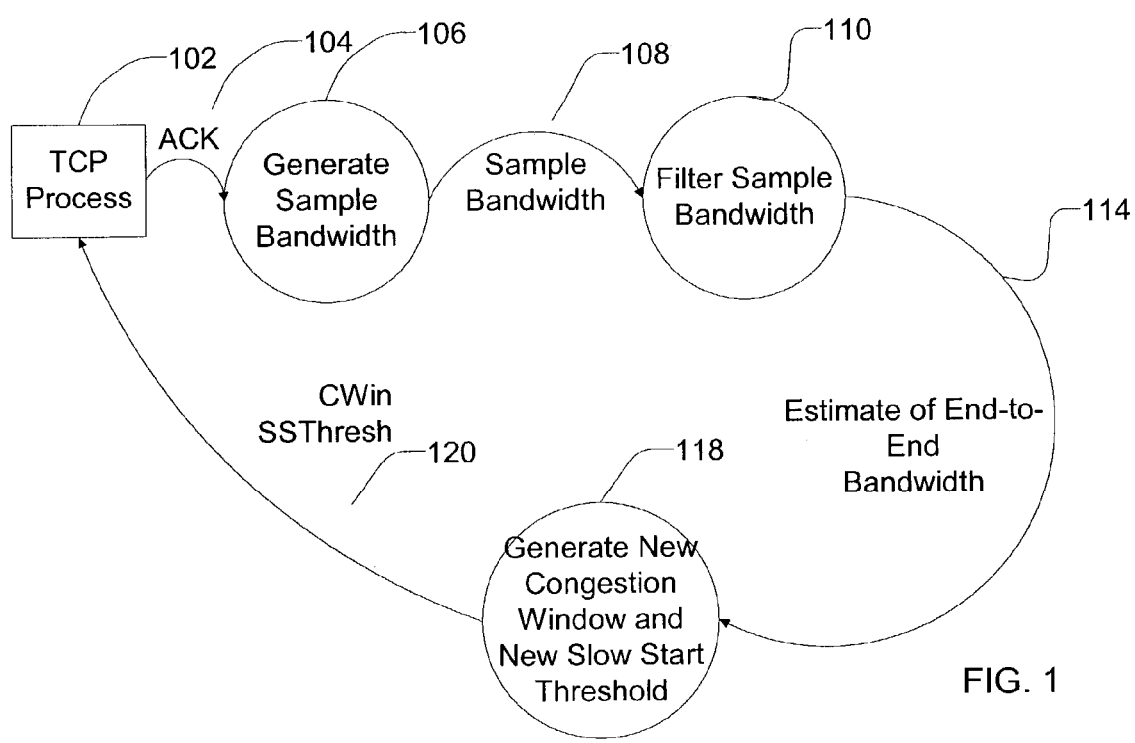
FIG. 1 is a process flow diagram of a TCP process in accordance with an exemplary embodiment of the present invention.

FIG. 1 is a process flow diagram of a TCP process in accordance with an exemplary embodiment of the present invention. A TCP source employing TCP Westwood 102 uses returning acknowledgments (ACKs) 104 to generate (106) a measurement of a sample bandwidth share (or data rate) 108 along a TCP connection path by measuring and averaging the rate of the ACKs. The samples of bandwidth share are filtered (110) to generate an estimate of end-to-end bandwidth share (or data rate) 114 for the connection path between the TCP source and a TCP receiver. When the TCP source detects a congestion episode (for example, the TCP source receives three duplicate ACKs or a timeout) the TCP source uses the end-to-end estimate of end-to-end bandwidth share to generate (118) a new congestion window (cwin) and a new slow start threshold (ssthresh) 120, starting a procedure herein termed "faster recovery".

In slightly more detail, a TCP source monitors received ACKs, and processes header information to determine an amount of data delivered at a TCP receiver. The amount of delivered data divided by the time required by the TCP source to deliver the data to the TCP receiver gives a measure of instant data rate. The instant data rate is then input to a filter. The output of the filter is an estimated end-to-end bandwidth share or data rate of the connection between the TCP source and a TCP receiver. For the entire duration of the connection, the TCP source updates its estimate of the end-to-end bandwidth share every time an ACK is received. The estimate is used whenever packet loss is indicated; that is, whenever a timeout expires or whenever three (3) duplicate ACKs are received.

In one embodiment of a TCP process in accordance with the present invention, the filter is a discrete time filter. In another TCP process in accordance with the present invention, the filter is an exponential averaging process.

Whenever the TCP source perceives a potential packet loss, the estimated end-to-end bandwidth share is used to set the congestion control parameters as follows: (1) the slow start threshold is set using the estimated end-to-end bandwidth share of the connection and the estimated round trip propagation time from the TCP source to the TCP receiver, and (2) if the size of the congestion window is greater than the slow start threshold, then congestion window is set to the size of the slow start threshold.

When an ACK is received by the TCP source, the ACK conveys the information that an amount of data corresponding to a specific transmitted packet was delivered to the TCP receiver. If the transmission process is not affected by losses, averaging the delivered data count over time yields an estimate of the bandwidth share, or source data rate, currently used by the TCP source.

The present invention provides a method to estimate the data rate of the connection even in the present of duplicate acknowledgments. When duplicate acknowledgments (DUPACKs) (indicating an out-of-sequence reception) reach the TCP source, the DUPACKs are counted toward the bandwidth estimate, and a new estimate is computed right after the reception of DUPACKs.

However, the TCP source may not be able to tell for sure which segment triggered the DUPACK transmission, and it may thus be unable to update the data count by the exact size of that segment. An average of the segment sizes sent thus far in the ongoing connection is therefore used, allowing for corrections when the next cumulative ACK is received. All TCP segments are assumed to be of the same size. Following this assumption, all sequence numbers are incremented by one per segment sent, although an actual TCP implementation keeps track of the number of bytes instead: the two notations are interchangeable if all segments have the same size.

Immediately after a congestion episode, followed either by a timeout or, in general, n duplicate ACKs, the bottleneck is at saturation and a connection delivery rate is equal to the share of the best-effort bandwidth (i.e., saturation bandwidth) available to that connection. At steady state, under proper conditions this is herein termed the "fair share". The saturation condition may be confirmed by the fact that packets have been dropped, an indication that one or more intermediate buffers are full. Before a congestion episode, the used bandwidth is less than or equal to the available bandwidth because the TCP source is still increasing its window to probe the network capacity. As a result, TCP Westwood adjusts its input by taking into account the network capacity that is available to it at the time of congestion.

FIG. 2 is a formula for generating a sample of an end-to-end bandwidth in accordance with an exemplary embodiment of the present invention. In the formula, $b_k$ is the sample bandwidth at time $t_k$ when an ACK is received at the TCP source, $t_k-1$ is the time a previous ACK was received at the TCP source, and $d_k$ is the amount of data reported to be delivered to the TCP receiver by the TCP source in the time interval between the two ACKs.

FIG. 3 is a formula for a discrete time filter as used by an embodiment of a TCP control process in accordance with the present invention. Since congestion occurs whenever low-frequency input traffic rate exceeds link capacity, a low-pass filter may be employed to average sampled measurements and to obtain low-frequency components of the available bandwidth. Averaging also filters out noise caused by delayed acknowledgments. The discrete time filter is a discrete form of a continuous low-pass filter using the Tustin Approximation where $\hat{b}_k$ is a filtered estimate of the end-to-end bandwidth at time $t=t_k$, and $1/\tau$ is the cut-off frequency of the filter.

FIG. 4 is a formula of a constant coefficient filter form of the discrete time filter of FIG. 3. To understand how the discrete time filter works it is useful to consider a constant interarrival time $t_k-t_{k-1}=\Delta_k=\tau/10$. Then, the discrete time filter becomes a filter with constant coefficients as shown in FIG. 4. The constant coefficient filter form shows that the new value $\hat{b}_k$ is made by the 90% of the previous value $\hat{b}_{k-1}$ plus the 10% of the arithmetic average of the last two samples $b_k$ and $b_{k-1}$. Even though the constant coefficients filter is useful to explain how the average is computed, it is not used because in packet-switched networks the interarrival time between ACKs is not constant. To counteract the effect of time-varying interarrival time, the coefficients of the discrete time filter depend on $t_k-t_{k-1}$. When the interarrival time increases, the last value $\hat{b}_{k-1}$ has less significance, since it represents an older value, whereas the significance of recent samples is higher. This is exactly what happens with the discrete time filter of FIG. 3: the "a" coefficient decreases when the interarrival time increases meaning that the previous value $\hat{b}_{k-1}$ has less significance with respect to the last two recent samples which are multiplied by (1−a).

Finally, the discrete time filter has a cut-off frequency equal to $1/\tau$. This means that all frequency components above $1/\tau$ are filtered out. According to the Nyquist sampling theorem, in order to sample a signal with bandwidth $1/\tau$ a sampling interval less than or equal to $\tau/2$ is necessary. But, since the ACK stream may be irregular(for instance, no ACKs are returned when the TCP source is idle), the sampling frequency constraint cannot be guaranteed. To guarantee the Nyquist constraint and thus preserve the low pass filter effect, if a time $\tau/m$ ($m \geq 2$) has elapsed since the last received ACK without receiving any new ACK, then the filter assumes the reception of a virtual sample $b_k=0$. As such, the value of $\hat{b}_k$ exponentially goes to zero in the absence of ACKs the estimated bandwidth.

As previously stated, DUPACKs should count toward the bandwidth estimation, since their arrival indicates a successfully received segment, albeit in the wrong order. As a consequence, a cumulative ACK should only count as one segment's worth of data since duplicate ACKs ought to have already been taken into account. However, the matter is further complicated by the issue of delayed ACKs. A standard TCP implementation provides for the possibility of an ACK being sent back once every other in-sequence segment received, or if a 200-ms timeout expires after the reception of a single segment. The combination of delayed and cumulative ACKs can potentially disrupt the bandwidth estimation process. This results in two aspects of the bandwidth estimation process:

a. The TCP source keeps track of the number of DUPACKs it has received before new data is acknowledged;

b. The TCP source detects delayed ACKs and acts accordingly.

An approach to take care of these two issues can be found in the AckedCount procedure, detailed below, showing the set of actions to be undertaken upon the reception of an ACK, for a correct determination of the number of packets (or equivalently data bytes) that should be accounted for by the bandwidth estimation procedure, indicated by the variable acked in the pseudocode. The key variable is accounted, which keeps track of the received DUPACKs. When an ACK is received, the number of segments it acknowledges is first determined (cumul_ack). If cumul_ack is equal to 0, then the received ACK is clearly a DUPACK and counts as 1 segment towards the end-to-end bandwidth estimate (BWE); the DUPACK count is also updated. If cumul_ack is larger than 1, the received ACK is either a delayed ACK or a cumulative ACK following a retransmission event; in that case, the number of ACKed segments is to be checked against the number of segments already accounted for (accounted_for). If the received ACK acknowledges fewer or the same number of segments than expected, it means that the "missing" segments were already accounted for when DUPACKs were received, and they should not be counted twice. If the received ACK acknowledges more segments than expected, it means that although part of them were already accounted for by way of DUPACKs, the rest are cumulatively acknowledged by the current ACK; therefore, the current ACK should only count as the cumulatively acknowledged segments. It should be noted that the last condition correctly estimates the delayed ACKs (cumul_ack=2 and accounted_for=0).

```
PROCEDURE AckedCount
    cumul_ack = current_ack_seqno - last_ack_seqno;
    if (cumul_ack = 0)
        accounted_for=accounted_for+1;
        cumul_ack=1;
    endif
    if (cumul_ack > 1)
        if (accounted_for >= cumul_ack)
            accounted_for = accounted_for - cumul_ack;
            cumul ack = 1;
        else if (accounted_for < cumul_ack)
            cumul_ack=cumul_ack - accounted_for;
            accounted_for = 0;
        endif
    endif
    last_ack_seqno=current_ack_seqno;
    acked=cumul_ack;
    return (acked);
END PROCEDURE
```

The end-to-end bandwidth estimation can be used by a congestion control algorithm executed at the TCP source side of a TCP connection. As will be explained, the congestion window dynamics during slow start and congestion avoidance are unchanged, that is they increase exponentially and linearly, respectively, as in current TCP Reno. The end-to-end bandwidth estimate (BWE), or eligible data rate, is used to set the congestion window (cwin) and the slow start threshold (ssthresh) after a congestion episode. The process can be understood by describing the general algorithm behavior after n duplicate ACKs and after coarse timeout expiration.

The pseudocode for the n duplicate ACKs portion of the algorithm is the following:

```
if (n DUPACKs are received)
    ssthresh = (BWE*RTTmin)/seg_size;
    if (cwin>ssthresh) /* congestion avoid.*/
        cwin = ssthresh;
    endif
endif
```

Note that seg_size identifies the length of a TCP segment in bits.

During the congestion avoidance phase, the TCP source probes for extra available bandwidth. Therefore, when n DUPACKs are received, it means that the TCP source has hit the network capacity (or that, in the case of wireless links, one or more segments were dropped due to sporadic losses). Thus, the slow start threshold is set equal to the available pipe size (which is based on the estimated connection data rate or bandwidth estimate (BWE), when the bottleneck buffer is empty, namely BWE*RTTmin. The congestion window is set equal to the ssthresh and the congestion avoidance phase is entered again to gently probe for new available bandwidth. The value RTTmin is set as the smallest Round Trip Time (RTT) sample observed over the duration of a connection. This setting allows the queue to be drained after a congestion episode. During the slow-start phase, the TCP source is still probing for the available bandwidth. Therefore the BWE we obtain after n duplicate ACKs is used to set the slow start threshold. After ssthresh has been set, the congestion window is set equal to the slow start threshold only if cwin>ssthresh. In other words, during slow start, cwin still features an exponential increase as in current implementations of TCP Reno.

The pseudocode of an after timeout expiration algorithm is:

```
if (timeout expires)
    ssthresh = (BWE*RTTmin)/seg_size;
    if (ssthresh < 2)
        ssthresh = 2;
    endif;
    cwin = 1;
endif
```

After a timeout cwin and ssthresh are set equal to 1 and BWE, respectively, so that the basic Reno behavior is still captured, while a speedy recovery is granted by the ssthresh being set to the bandwidth estimation at the time of timeout expiration.

In another embodiment of a TCP control process in accordance with the present invention employing the use of bandwidth estimation, faster recovery after a coarse timeout is achieved. To overcome the lack of information on the actual available bandwidth while a congestion window is still growing, available bandwidth is estimated by looking at the reception rate of acknowledgments. Several cases arise. In one case the TCP connection has a heavy backlog and it suddenly experiences congestion at a bottleneck. In such conditions, it likely that a timeout expires or three duplicate acknowledgments are received. In the meantime, the TCP source has been transmitting at a rate greater than the available bandwidth. In that case, the rate of acknowledgments is proportional to the rate of data delivered to the TCP receiver, providing a good estimate of the (reduced) available bandwidth.

If a sporadic or random loss has occurred, the rate of received acknowledgments is only marginally affected, and the bandwidth estimation will show little change. The TCP control process uses the estimate of available bandwidth to set the slow start threshold and to compute the congestion window. The rate of acknowledgment is estimated through an exponential averaging process. The averaging process is run upon the reception of an ACK, including duplicate ACKs (since they signal the reception of data, although out of sequence). The process is detailed by the following pseudo-code:

```
if (ACK is received) {
    sample_BWE = pkt_size*8/(now - lastacktime) ;
    BWE = BWE*alpha + sample_BWE*(1 - alpha) ;
}
``` where pkt size indicates the segment size in bytes, now indicates the current time, and lastacktime the time the previous ACK was received. Alpha determines the smoothing operated by the exponential filtering. It should be noted that since the segment size is usually not fixed, the value pkt size can set as the average size of the last n received segments. A similar problem arises with duplicate ACKs, since they do not carry information on the size of the received segment. In this case, the average size computed before the reception of the duplicate ACK is used, and the average size is updated only when new data are acknowledged.

A Faster Recovery TCP algorithm (FR-TCP) behaves like TCP Reno as far as the sequence of actions following a triple duplicate ACK or a coarse timeout expiration are concerned; however, the estimated bandwidth (BWE) is used to set the congestion window (CWIN) and the ssthresh as follows:

```
triple duplicate ACKS:
    ssthresh = (BWE * RTTmin ) /a
    if (CWIN > ssthresh)
        CWIN = sstrhesh;
    end if
timeout expiration:
    ssthresh = (BWE * RTTmin ) /a
    CWIN =1
``` where RTT min is the smallest Round Trip Time (RTT) recorded by TCP for that specific connection and a is a reduction factor. Assuming the minimum RTT excludes queueing delays, the process converges to a situation where the transmission rate is equal to the actual available bandwidth between a TCP source and a TCP receiver.

The rationale of this strategy is as follows. The estimate of the available bandwidth is used to set the ssthresh equal to a fraction 1/a of BWE*RTT min. In the presence of one or few TCP connections, a good choice for a is 1, whereas in the presence of many TCP connections a better choice is a=2 or greater. Increasing a may mitigate the degradation of TCP performance known as "many-flows effect".

In another TCP control process in accordance with an exemplary embodiment of the present invention, the TCP source recognizes when the output rate can be safely. This TCP control process is herein termed Gradual Faster Recovery TCP (GFR-TCP). As described above, in the slow start phase, a TCP source may grab bandwidth quickly. In contrast, in the congestion avoidance phase, it takes a relatively long time for the TCP source to reach maximum available bandwidth. If the TCP source experiences consecutive segment losses, the slow start threshold becomes very small, and this leads to congestion avoidance with very small congestion window. Subsequently, even though the available bandwidth might have drastically increased, the TCP control process, unaware of the bandwidth increase, widens the congestion window linearly (for example rather slowly). Thus, while there is a need for a bandwidth-aware window-decreasing algorithm(as in FR-TCP), a way to recognize when the output rate can be safely increased is also useful. GFR-TCP handles the latter case. The following is the pseudo-code for the GFR-TCP algorithm:

```
If (CWIN > ssthresh) AND (CWIN < BWE*RTT_min) then
    ssthresh = ssthresh + (BWE*RTT_min-ssthresh) /2;
``` where CWIN is the TCP congestion window in segments, BWE is the bandwidth estimation in segments/sec, RTT is the round-trip time that TCP keeps monitoring, and ssthresh is the TCP slow start threshold.

Thus, the process monitors the available bandwidth share in the congestion avoidance phase and periodically increase the slow start threshold if the conditions allow it. To apply the process periodically, the TCP slow timer is used. In one embodiment of a TCP control process in accordance with the present invention, the standard TCP value of 500 ms is used.

GFR-TCP employs the same mechanisms as FR-TCP to set the congestion window and the slow start threshold on segment losses, but periodically checks the condition described above. Whenever the condition is met, the process recomputes the slow start threshold which forces TCP to reenter the slow start phase. Repeatedly carrying out the process, TCP can reach the available bandwidth much more rapidly than if it remained in congestion avoidance all this time.

Figure 5:
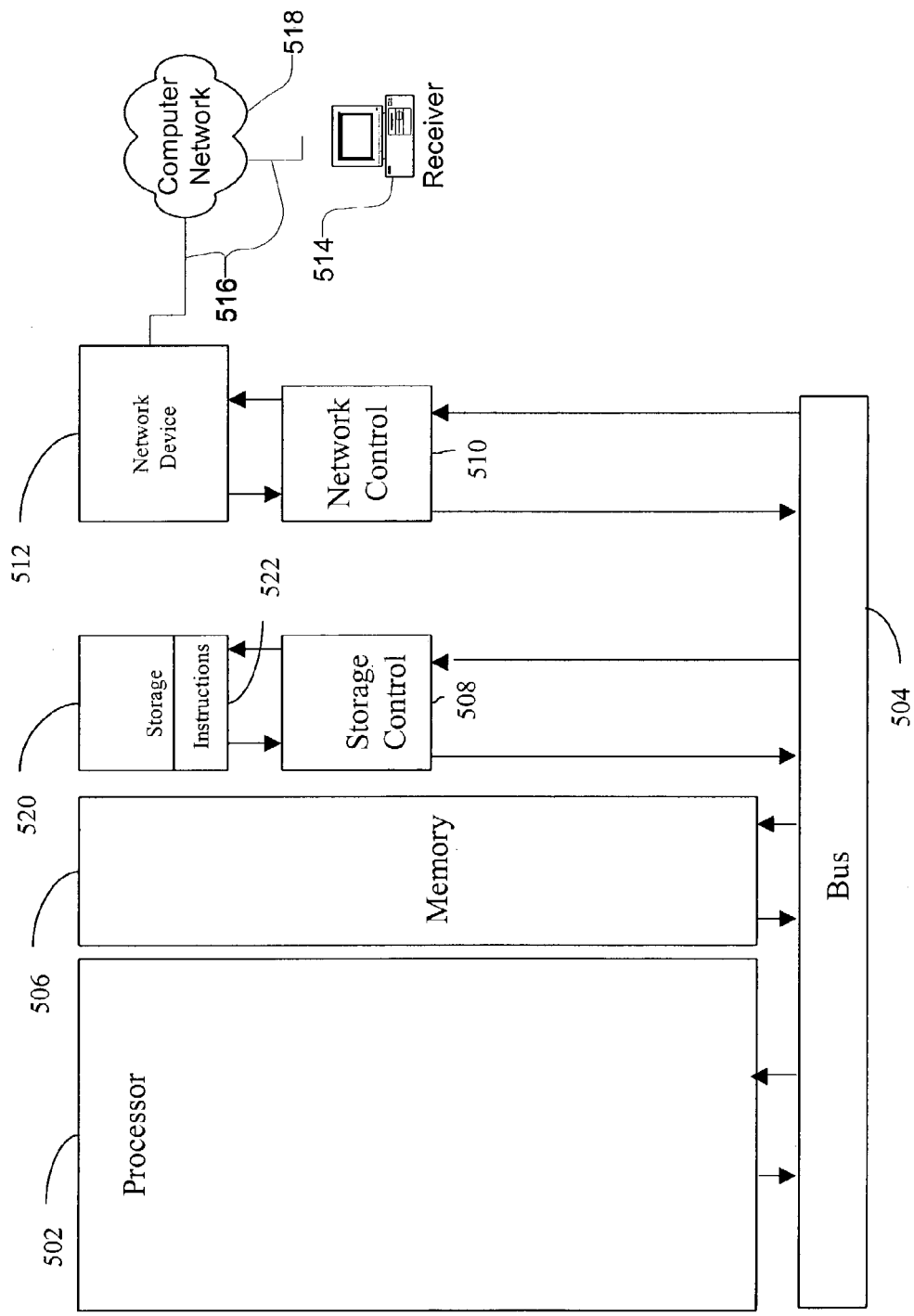
FIG. 5 is a block diagram of a computing device suitable for hosting a TCP process in accordance with an exemplary embodiment of the present invention.

FIG. 5 is a block diagram of a computing device suitable for hosting a transport protocol control process in accordance with an exemplary embodiment of the present invention. A host 500 includes a processor 502 coupled via a bus 504 to a memory device 506, a storage device controller 508, and a network device controller 510. The processor uses the network device controller to control the operations of a network device 512 which is adapted for communications using a transport protocol to transmit data to a receiver 514 across a connection 516 through a computer network 518.

The storage controller is coupled to a storage device 520 having a computer readable storage medium for storage of program instructions 522 executable by the processor. The program instructions are stored in the storage device until the processor retrieves the program instructions and stores them in the memory. The processor then executes the program instructions stored in memory to implement the transport protocol control process as previously described.

Although this invention has been described in certain specific embodiments, many additional modifications and variations would be apparent to those skilled in the art. It is therefore to be understood that this invention may be practiced otherwise than as specifically described. Thus, the present embodiments of the invention should be considered in all respects as illustrative and not restrictive, the scope of the invention to be determined by claims supported by this application and the claims' equivalents rather than the foregoing description.

What is claimed is:

1. A method for setting a congestion control window for transmitting data between a plurality of computing devices across a connection through a computer network, comprising:

generating under control of a first one of the computing devices an estimate of end-to-end bandwidth share currently achieved by the connection of the first one of the computing devices through the computer network, wherein the estimated end-to-end bandwidth share currently achieved by the connection is generated from monitoring a time interval associated with one or more acknowledgement packets received by the first one of the computing devices;

detecting under control of the first one of the computing devices a congestion indicator configured to indicate congestion on the computer network; and if the congestion indicator is detected, performing the steps comprising:

adjusting under control of the first one of the computing devices the congestion control window and a slow start threshold using the estimated end-to-end bandwidth; and setting the congestion window to the size of the slow start threshold if the size of the congestion window is greater than the slow start threshold.

2. The method of claim 1, wherein the time interval is time elapsed between receipt of a prior acknowledgment packet and a current acknowledgment packet, and generating the estimated end-to-end bandwidth share currently achieved by the connection includes:

generating a sample bandwidth share by determining an amount of data acknowledged by the current acknowledgment packet and dividing the amount of data by the time interval; and filtering the sample bandwidth share to generate the estimated end-to-end bandwidth share currently achieved by the connection.

3. The method of claim 2 further comprising:

updating the estimated end-to-end bandwidth share achieved for the connection for each received acknowledgment packet.

4. The method of claim 2, wherein the amount of acknowledged data is included as header information in the current acknowledgment packet.

5. The method of claim 2, wherein the sample bandwidth share is filtered using a discrete time filter.

6. The method of claim 1, wherein the congestion indicator is a duplicate acknowledgement packet transmitted by one of the computing devices.

7. The method of claim 1, wherein the congestion indicator is loss of a data packet.

8. The method of claim 1, wherein the time interval is time elapsed between receipt of a prior acknowledgment packet and a current acknowledgment packet, and generating the estimated end-to-end bandwidth share currently achieved by the connection includes:

determining an amount of data acknowledged by the current acknowledgment packet; and dividing the amount of data by the time interval.

9. The method of claim 8, wherein the amount of acknowledged data is included as header information in the current acknowledgment packet.

10. An apparatus for setting a congestion control window for transmitting data between a plurality of computing devices across a connection through a computer network, comprising:

a processor; and a memory coupled to the processor, the memory having processor executable program instructions stored therein, the program instructions when executed by the processor perform the steps including:

generating under control of a first one of the computing devices an estimate of end-to-end bandwidth share currently achieved by the connection of the first one of the computing devices through the computer network, wherein the estimated end-to-end bandwidth share currently achieved by the connection is generated from monitoring a time interval associated with one or more acknowledgement packets received by the first one of the computing devices;

detecting under control of the first one of the computing devices a congestion indicator configured to indicate congestion on the computer network; and if the congestion indicator is detected, performing the steps comprising:

adjusting under control of first one of the computing devices the congestion control window and a slow start threshold using the estimated end-to-end bandwidth; and setting the congestion window to the size of the slow start threshold if the size of the congestion window is greater than the slow start threshold.

11. The apparatus of claim 10, wherein the time interval is time elapsed between receipt of a prior acknowledgment packet and a current acknowledgment packet, and the program instructions for generating the estimated end-to-end bandwidth share currently achieved by the connection further include:

generating a sample bandwidth share by determining an amount of data acknowledged by the current acknowledgment packet and dividing the amount of data by the time interval; and filtering the sample bandwidth share to generate the estimated end-to-end bandwidth share currently achieved by the connection.

12. The apparatus of claim 11, wherein amount of acknowledged data is included as header information in the current acknowledgment packet.

13. The apparatus of claim 11, wherein the sample bandwidth share is filtered using an exponential filter.

14. The apparatus of claim 11, wherein the sample bandwidth share is filtered using a discrete time filter.

15. A computer-readable medium storing program instructions for setting a congestion control window for transmitting data between a plurality of computing devices across a connection through a computer network, the program instructions when executed perform the steps comprising:

generating under control of a first one of the computing devices an estimate of end-to-end bandwidth share currently achieved by the connection of the first one of the computing devices through the computer network, wherein the estimated end-to-end bandwidth share currently achieved by the connection is generated from monitoring a time interval associated with one or more acknowledgement packets received by the first one of the computing devices;

detecting under control of the first one of the computing devices a congestion indicator configured to indicate congestion on the computer network; and if the congestion indicator is detected, performing the steps comprising:

adjusting under control of the first one of the computing devices the congestion control window and a slow start threshold using the estimated end-to-end bandwidth; and setting the congestion window to the size of the slow start threshold if the size of the congestion window is greater than the slow start threshold.

16. The computer-readable medium of claim 15, wherein the time interval is time elapsed between receipt of a prior acknowledgment packet and a current acknowledgment packet, and the program instructions for generating the estimated end-to-end bandwidth share comprise:

generating a sample bandwidth share by determining an amount of data acknowledged by the current acknowledgment packet and dividing the amount of data by the time interval; and filtering the sample bandwidth share to generate the estimated end-to-end bandwidth share currently achieved by the connection.

17. The computer-readable medium of claim 16, wherein amount of acknowledged data is included as header information in the current acknowledgment packet.

18. The computer-readable medium of claim 16, wherein the sample bandwidth share is filtered using an exponential filter.

19. The computer-readable medium of claim 16, wherein the sample bandwidth share is filtered using a discrete time filter.

* * * * *

UNITED STATES PATENT AND TRADEMARK OFFICE
CERTIFICATE OF CORRECTION

PATENT NO. : 7,299,280 B2
APPLICATION NO. : 10/272646
DATED : November 20, 2007
INVENTOR(S) : Mario Gerla et al.

It is certified that error appears in the above-identified patent and that said Letters Patent is hereby corrected as shown below:

On the Title Page

Item (57) Abstract, line 6 — Delete "requited", Insert --required--

Item (57) Abstract, line 13 — Delete "the reset", Insert --to reset--

In the Claims

Column 12, line 1, Claim 10 — After the word "of", Insert --the--

Column 12, line 21, Claim 12 — After the word "wherein", Insert --the--

Column 13, line 2, Claim 17 — Before the word "amount", Insert --the--

Signed and Sealed this

Twenty-sixth Day of August, 2008

JON W. DUDAS
*Director of the United States Patent and Trademark Office*